United States Patent
Arai et al.

(10) Patent No.: US 7,758,013 B2
(45) Date of Patent: Jul. 20, 2010

(54) MOTOR-OPERATED VALVE

(75) Inventors: Yusuke Arai, Tokyo (JP); Hitoshi Umezawa, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 446 days.

(21) Appl. No.: 11/899,517

(22) Filed: Sep. 6, 2007

(65) Prior Publication Data
US 2008/0067464 A1 Mar. 20, 2008

(30) Foreign Application Priority Data

Sep. 20, 2006 (JP) .............................. 2006-254896
Apr. 10, 2007 (JP) .............................. 2007-103157

(51) Int. Cl.
*F16K 31/04* (2006.01)

(52) U.S. Cl. ...................... 251/85; 251/97; 251/129.11; 251/337

(58) Field of Classification Search ............. 251/129.11, 251/129.12, 129.13, 337, 84, 85, 97, 87
See application file for complete search history.

(56) References Cited

U.S. PATENT DOCUMENTS 3,985,331 A * 10/1976 Riley et al. .................. 251/77
4,229,387 A * 10/1980 Rogerson et al. ....... 251/129.11
4,436,279 A * 3/1984 Bonds et al. .................. 251/86
5,407,173 A * 4/1995 Smith .......................... 251/86
6,644,621 B2 * 11/2003 Ji et al. .................. 251/129.02

FOREIGN PATENT DOCUMENTS

| JP | H08-226564 | 9/1996 |
| JP | 2000-346226 | 12/2000 |
| JP | 2005-048779 | 2/2005 |

* cited by examiner

*Primary Examiner*—John Bastianelli
(74) *Attorney, Agent, or Firm*—Fildes & Outland, P.C.

(57) ABSTRACT

A motor-operated valve includes a driving unit including a rotor and a stator, a feed screw mechanism, and a valve main body unit. In order to remove backlash intrinsic in the feed screw mechanism, a coil spring that urges a valve body in a direction away from a valve seat is arranged in a valve chamber. A spring bearing that forms a housing, in which the coil spring is housed, in the valve chamber is provided. Therefore, the large valve chamber is secured in the valve main body unit and passing sound is reduced when a fluid passes the motor-operated valve. Contact surfaces of the valve body and the coil spring can be aligning curved surfaces that absorb a bend of the coil spring.

6 Claims, 16 Drawing Sheets

X-X' SECTION

Y ARROW VIEW

NUMBER OF TEETH OF
SUN GEAR: 22
NUMBER OF TEETH OF
PLANETARY GEARS: 11
NUMBER OF TEETH OF
INTERNAL GEAR: 44

EXAMPLE OF MESHING
IN WHICH THE NUMBER OF PLANETARY GEARS IS 3

NUMBER OF TEETH OF
SUN GEAR: 13
NUMBER OF TEETH OF
PLANETARY GEARS: 13
NUMBER OF TEETH OF
INTERNAL GEAR: 39

EXAMPLE OF MESHING
IN WHICH THE NUMBER OF PLANETARY GEARS IS 4

1

MOTOR-OPERATED VALVE

The present application is based on and claims priority of Japanese patent applications No. 2006-254896 filed on Sep. 20, 2006, and No. 2007-103157 filed on Apr. 10, 2007, the entire contents of which are hereby incorporated by reference.

BACKGROUND OF THE INVENTION

1. Field of the Invention

The present invention relates to, for example, a motor-operated valve used for controlling a flow rate of a coolant in an air conditioner.

2. Description of the Related Art

FIG. 14 is a longitudinal sectional view showing an example of a conventional motor-operated valve disclosed in Japanese Patent Laid-Open Publication No. 2000-346226 (Patent Document 1). A motor-operated valve 100 includes a valve main body 120 having a valve chamber 121 and a valve seat 122 formed in the valve chamber 121, a valve body 123 that comes into contact with and moves away from the valve seat 122 to open and close an opening of the valve seat 122, and a can 140 fixed to the valve main body 120. A rotor 130 is built in the can 140. A stator 142 that drives to rotate the rotor 130 is externally fit over the can 140. A pipe 120a extending downward from the bottom surface of the valve main body 120 and a pipe 120b expending in the horizontal direction from the side of the valve main body 120 are provided in the valve main body 120. A coolant is led into the valve chamber 121 and the coolant in the valve chamber 121 is led out to the outside by these pipes 120a and 120b.

The can 140 is formed of nonmagnetic metal and assumes a topped cylindrical shape. The can 140 is fixed to a collar-like plate 141, which is fixed in an upper part of the valve main body 120, by welding or the like. The inside of the can 140 is kept in a hermetically sealed state. The stator 142 includes a stator main body 143 and a jacket section 144 made of resin that covers the outer side of the stator body 143. The stator main body 143 includes a yoke 151 made of a magnetic material and upper and lower stator coils 153 wound around the yoke 151 via a bobbin 152. The jacket section 144 has a fitting hole 144a that is externally fit over the can 140.

The valve body 123 including a needle valve is formed at the lower end of a valve shaft 124. The rotation of the rotor 130 is converted into actions of the valve body 123 coming into contact with and moving away from the valve seat 122 by a driving mechanism. This driving mechanism is a feed screw mechanism including a tubular guide bush 126 that is fixed in the valve main body 120 to project in the direction of the rotor 130 and in which a fixed screw section 125 is formed and a valve shaft holder 132 having a moving screw section 131 that screws in the fixed screw section 125. The fixed screw section 125 is formed as a male screw formed in the outer periphery of the guide bush 126. The moving screw section 131 is formed as a female screw formed in the inner periphery of the valve shaft holder 132.

The valve shaft holder 132 is located on the outer side of the guide bush 126 and assumes a topped cylindrical shape opened downward. An upper reduced-diameter section of the valve shaft 124 is fit in the center of a top wall of the valve shaft holder 132 and coupled to the valve shaft holder 132 by a push nut 133. The valve shaft 124 is fit into the center of the valve shaft holder 132 to be movable up and down. The valve shaft 124 is always urged downward by a compression coil spring 134 contracted in the valve shaft holder 132. A pressure equalizing hole 126b for equalizing pressures in the valve chamber 121 and the can 140 is formed in the sidewall of the guide bush 126.

A return spring 135, which is a cylindrical compression coil spring, is attached to the outer periphery of the push nut 133 pressed in and fixed to the upper end of the valve shaft 124. When the fixed screw section 125 of the guide bush 126 and the moving screw section 131 of the valve shaft holder 132 are unscrewed, the return screw 135 comes into contact with the inner surface of the can 140 and urges both the screw sections 125 and 131 to be screwed again.

The valve shaft holder 132 and the rotor 130 are coupled via a support ring 136. An upper projection of the valve shaft holder 132 is fit in an inner peripheral hole of the support ring 136 and caulks the outer periphery of this upper projection, whereby the rotor 130, the support ring 136, and the valve shaft holder 132 are coupled.

A ring-like lower stopper body 127 is fixed to the guide bush 126. A tabular lower stopper piece 127a is protrudingly provided in an upper part of the lower stopper body 127. A ring-like upper stopper body 137 is fixed to the valve shaft holder 132. A tabular upper stopper piece 137a is protrudingly provided in a lower part of the upper stopper body 137 to be engageable with the lower stopper piece 127a.

The stator 142 has plural lead terminals 154 connected to the stator coils 153. A connector 156 to which plural lead wires 155 are connected is coupled to the lead terminals 154. A cover 157 that covers the connector 156 is welded to the stator 142. A filler 158 such as epoxy resin is filled in the cover 157.

The can 140 is fit in the fitting hole 144a of the jacket section 144 of the stator 142. The jacket section 144 is prevented from rotating with respect to the valve main body 120 and the can 140 by a baffle member 159 bonded to the lower surface of the jacket section 144. Although not shown in the figure, the baffle member 159 has a horizontal top wall and two arm sections extending downward from both side edges of this top wall. In the top wall, a positioning section projecting upward from one end of the top wall is formed. The baffle member 159 is fixed by inserting a projection projecting from the lower surface of the stator 142 into an attaching hole formed in the top wall and crushing the projection with an ultrasonic welder. Reference numeral 145' denotes the crushed projection. The stator 142 fits in the fitting hole 144a over the can 140 and pushes the can 140 in the direction of the valve main body 120. Then, the two arm sections of the baffle member 159 nip and hold the pipe 120b, which extends in the horizontal direction, in a radial direction thereof. Thus, the stator 142 can be extremely easily and surely fixed to the valve main body 120 and the can 140.

In the motor-operated valve 100, the feed screw mechanism described above is usually adopted to move the valve shaft 124 smoothly. The rotation of the rotor 130 is converted into the up and down movement of the valve body 123 by the feed screw mechanism to change a valve opening to thereby control a flow rate of a fluid. Because of the structure of the feed screw mechanism, it is inevitable that a certain degree of backlash occurs in a screw engaging section of the male screw and the female screw.

A sectional view in which a part of the feed screw mechanism is enlarged is shown in FIG. 15. When the valve is opened, the moving screw section 131 is pushed down by the rotation of the rotor (the fixed screw section 125). When the fluid flows in a direction from the pipe 120b to the pipe 120a in FIG. 14, an upward force due to the pressure of the fluid is rarely generated. As a result, a load applied to the moving screw section 131 is mainly a downward load. In other words, as shown in FIG. 15A, a lower spiral surface 125*b* of the fixed screw section 125 comes into contact with an upper spiral surface 131*a* of the moving screw section 131 and pushes down the moving screw section 131 to bring the moving screw section 131 into contact with the valve seat. To open the valve from this state, first, the fixed screw section 125 has to be rotated to a state shown in FIG. 15B to absorb the backlash.

When the fluid flows in a direction from the pipe 120*a* to the pipe 120*b* in FIG. 14, a load applied to the screws is applied upward because of a force generated by the flow of the fluid. Thus, as shown in FIG. 15A, the valve is opened while the screws are in contact with each other on the upper side. The screws in contact with each other on the upper side may move to the lower side after the valve opening because of a balance of a load based on a decrease in the upward load due to the flow.

As described above, since a way of contact of the screws changes according to a difference in a flow direction, a valve opening point is different depending on a flow direction of the fluid. When screw contact surfaces change during control of a flow rate, a difference in a flow rate characteristic curve occurs. When a lift amount of the valve shaft per one pulse of a driving pulse applied to a pulse motor is large, an influence due to the backlash is relatively small. However, in the motor-operated valve of this type, for example, measures for providing a reduction mechanism between the motor and the feed screw mechanism are taken according to requests for precise flow rate control in these days. Thus, the lift amount of the valve shaft per one pulse of the driving pulse tends to be small. When the lift amount of the valve shaft per one pulse applied to the motor is extremely small, a flow rate in the beginning of the opening of the valve and a flow rate in the end of the closing do not coincide with each other, which is so-called hysteresis (a flow rate difference). This flow rate difference cannot be neglected in the flow rate control.

As a form of the existing motor-operated valve, there is a motor-operated valve that adopts bellows that form a partition wall against a coolant. A main part of an example of the motor-operated valve is shown in FIG. 16 as a sectional view. Since a structure of an upper part of the motor-operated valve may be equivalent to that shown in FIG. 14, the structure is not shown in FIG. 16. The moving screw section 131 to which power of a stepping motor is transmitted is screw-engaged with the fixed screw section 125. Bellows 160 are disposed on the outer side of the valve shaft 124. Upper ends 161 of the bellows 160 are fixed to the valve main body by caulking or soldering via a ring member 167. Lower ends 162 of the bellows 160 are fixed to a valve shaft 124. The bellows 160 prevents the coolant led into a chamber 163 communicating with the valve chamber 121 from entering a can provided in an upper part of the motor-operated valve. A ball bearing member 166 that receives a ball 165 is inserted in and fixed to the upper end of the valve shaft 124. The moving screw section 131 serving as a screw shaft comes into contact with an upper part of the ball 165. The thrust in an axial direction generated by a feed screw action by the feed screw mechanism is transmitted to the valve shaft 124 side through the ball 165 and the ball bearing member 166. An upward lifting force acts on the valve shaft 124 according to a bearing load based on an elastic force of the bellows 160 and a pressure difference between the inside and the outside of the bellows 160. Therefore, the moving screw section 131 is always pushed upward and the hysteresis due to the backlash present in the screw section is relaxed. However, the bellows 160 are expensive, have poor moldability, and require complicated assembly work such as soldering. Therefore, the bellows 160 obstruct a reduction in manufacturing cost of the motor-operated valve.

There is also proposed a motor-operated valve in which a coil spring as elastic means for removing the backlash of screws present in a feed screw mechanism for converting output rotation of a motor into an axial direction displacement of a valve body is arranged between a valve holder or a valve main body and a stem or a valve shaft. In examples of the motor-operated valve, the coil spring is arranged in a position above a valve chamber (Japanese Patent Laid-Open Publication No. 8-226564 (Patent Document 2) and Japanese Patent Laid-Open Publication No. 2005-48779 (Patent Document 3)). In this case, there is a drawback in that a dimension in the vertical direction of the motor-operated valve is large.

SUMMARY OF THE INVENTION

The present invention has been devised in view of the problems and it is an object of the present invention to provide a small and inexpensive motor-operated valve that can solve hysteresis that tends to occur between the rotation of a motor and a valve opening.

In order to solve the problems, a motor-operated valve according to the present invention includes a valve main body that has a valve chamber and a valve seat formed in the valve chamber, a valve body that comes into contact with and moves away from the valve seat to adjust a passing flow rate of a fluid, a driving unit that has a rotor and a stator that drives to rotate the rotor, a feed screw mechanism that converts the rotation of the rotor into actions of the valve body coming into contact with and moving away from the valve seat, and a spring that urges the valve body in a direction away from the valve seat to remove backlash intrinsic in the feed screw mechanism, wherein the spring is arranged in the valve chamber.

In the motor-operated valve, since the spring is arranged in the valve chamber, backlash intrinsic between spiral screw surfaces of the feed screw mechanism is absorbed and hysteresis does not occur in a relation between the rotation of the feed screw mechanism and a movement amount of the valve body during the end of valve closing and during the start of valve opening. Therefore, it is possible to prevent an invalid stroke from occurring in the feed screw mechanism. It is also possible to set a dimension in the vertical direction of the motor-operated valve small compared with the motor-operated valve in which the spring is arranged above the valve chamber.

DETAILED DESCRIPTION OF THE PREFERRED EMBODIMENTS

Figure 1:
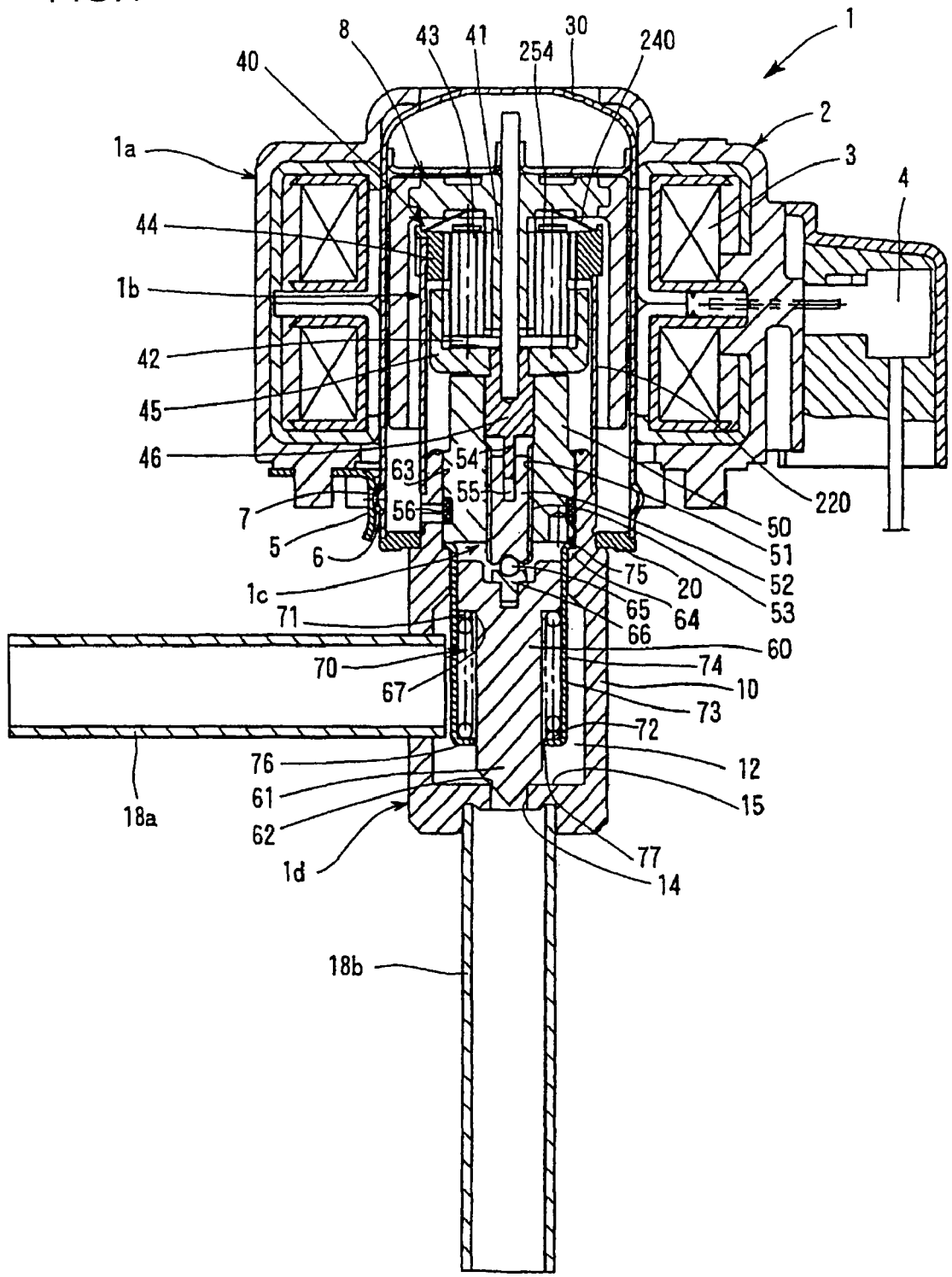
FIG. 1 is a sectional view showing an overall structure of a motor-operated valve according to an embodiment of the present invention.

FIG. 1 is a sectional view showing an overall structure of a motor-operated valve according to an embodiment of the present invention. The motor-operated valve generally denoted by reference numeral 1 includes a driving unit 1a including a motor that acts according to an excitation function and includes a stator and a rotor, a gear reduction unit 1b that receives a rotational driving force generated by the driving unit 1a, performs gear reduction, and outputs reduced rotation, and a feed screw mechanism 1c that converts the reduced rotation from the gear reduction unit 1b into displacement in a screw axis direction according to a screw action.

Reference numeral 30 denotes a can of a topped cylindrical shape, which is a hermetically sealed container, fixed to a valve main body 10 via a bearing member 20. The driving unit 1a has a motor excitation device 2 that is disposed in the outer periphery of the can 30 and in which a coil 3 wound around a bobbin and constituting a stator of an electric motor is integrally molded with resin and a rotor assembly 8 of a permanent magnet type that is rotatably supported in the can 30 and is driven to rotate by the motor excitation device 2. The motor excitation device 2 and the rotor assembly 8 constitute a stepping motor as an example of the electric motor.

The motor excitation device 2 is detachably fit over the can 30 by a fitting 5 formed by a leaf spring. In this embodiment, a projection 6 formed in the can 30 is elastically fit in an engagement hole 7, which is formed in the fitting 5, and positioned. In order to excite the stator, the motor excitation device 2 receives power feed with the coil 3 connected to an external power supply via a connector 4 and a lead. In the valve main body 10, a valve chamber 12 is formed therein and an orifice 14, which is opened in the bottom surface of the valve main body 10, is formed in a bottom 15 thereof. A pipe 18a communicating with a side of the valve chamber 12 and a pipe 18b communicating with the lower end of the orifice 14 are fixed to the valve main body 10.

The gear reduction unit 1b includes a planetary gear reduction mechanism (hereinafter abbreviated as "reduction mechanism") 40 that reduces the rotation of the rotor assembly 8. The reduction mechanism 40 includes a sun gear 41 integral with the rotor assembly 8, plural planetary gears 43 that are rotatably supported by a carrier 42 and mesh with the sun gear 41, a ring gear 44 that is fixed to and supported by the valve main body 10 and meshes with a part of the planetary gears 43, and an output internal gear 45 having the number of teeth slightly different from the number of teeth of the ring gear 44. The rotation of the rotor assembly 8 reduced by the reduction mechanism 40 is transmitted to an output shaft 46 of the feed screw mechanism 1c via the output internal gear 45. In this embodiment, the planetary gear reduction mechanism is provided as the reduction mechanism 40. However, instead of the planetary gear reduction mechanism, a mechanism of a train of gears arranged to mesh one another in series may be provided. Alternatively, the reduction mechanism 40 is not always necessary and the rotation of the rotor may be directly inputted to a screw mechanism. The reduction mechanism 40 and the feed screw mechanism 1c are explained in detail below with reference to FIGS. 3 to 9.

Figure 3A:
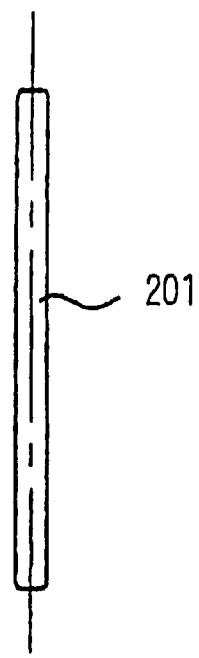
FIGS. 3A and 3B are sectional views showing details of a bearing, a shaft, and a rotor assembly.
Figure 3B:
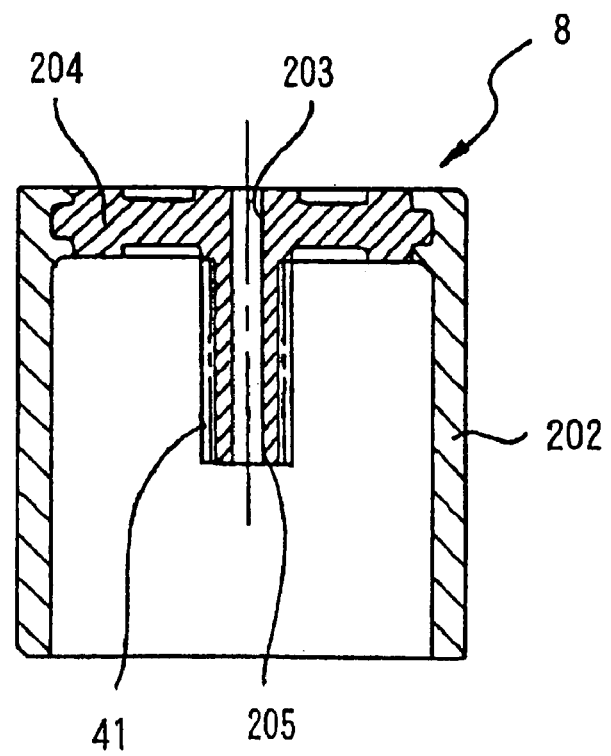

FIGS. 3A and 3B are sectional views showing details of a shaft 201 and the rotor assembly 8. The rotor assembly 8, which is a permanent magnet type rotor of the stepping motor, is disposed to be rotatable by the shaft 201 in the can 30. The rotor assembly 8 is formed in a topped cylindrical shape with a plastic material containing a magnetic material. In the rotor assembly 8, a cylinder 202 as a peripheral wall and a sun gear member 204 disposed in the center are integrally molded. A boss 205 that extends vertically downward and has a through hole 203 for the shaft 201 is provided in the center of the sun gear member 204. The sun gear 41, which is a component of the reduction mechanism 40, is formed on the outer side of the boss 205.

Figure 4A:
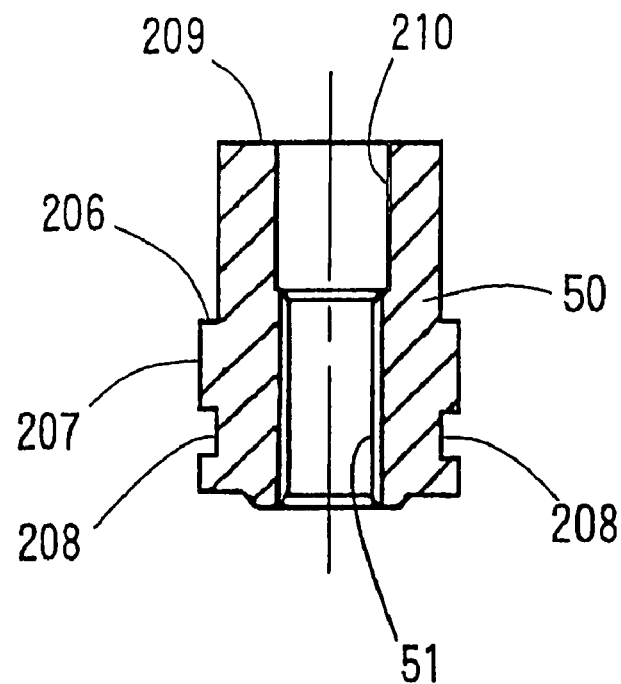
FIGS. 4A and 4B are sectional views showing details of a holder, a screw bearing, a screw shaft, and a ball.
Figure 4B:
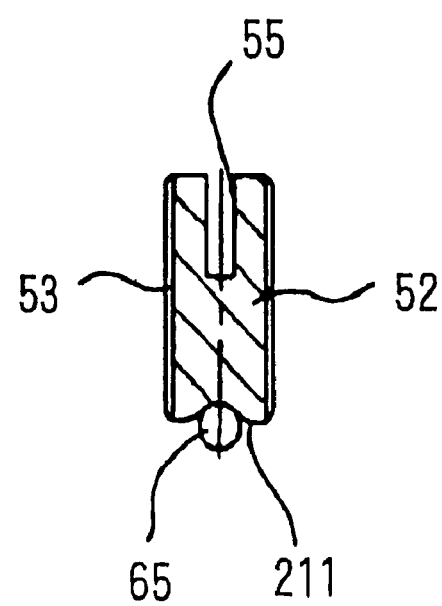

FIG. 4A is a sectional view showing details of a cylindrical bearing 50 constituting the feed screw mechanism 1c. FIG. 4B is a sectional view showing details of a screw shaft 52 and a ball 65. In the cylindrical bearing 50, an outer peripheral section 207 on the lower side is fit in the valve main body 10. The cylindrical bearing 50 is supported by a stepped section 64 of the valve main body 10 in a lower end outer edge thereof via an upper flange section 75 of a spring bearing main body 74 described later. An attaching section 206 in the outer periphery of the cylindrical bearing 50 is attached to be unremovable from the valve main body 10 side by means such as press working. In the outer peripheral section 207, an annular recess 208 that functions as a seal and a filter for foreign matter removal and in which a ring 56 formed of foam metal or the like is fit is formed. An upper end surface 209 of the cylindrical bearing 50 supports the output internal gear 45 of the reduction mechanism 40 from below. The output shaft 46 of the reduction mechanism 40 is fit in an upper inner peripheral section 210 of the cylindrical bearing 50. The cylindrical bearing 50 has a female screw section 51 formed in a lower part of the inner periphery thereof. The female screw section 51 is screwed with a male screw section 53 formed in the outer periphery of the screw shaft 52. In an upper part of the screw shaft 52, a slit-like recess 55 in which a projection 54 as a flat driver section of the output shaft 46 of the reduction mechanism 40 is inserted is formed. The ball 65 is fixed in a recess 211 in a lower part of the screw shaft 52. The rotation of the screw shaft 52 is converted into the movement in the axial direction and transmitted to the valve body 60 side via the ball 65.

Figure 5A:
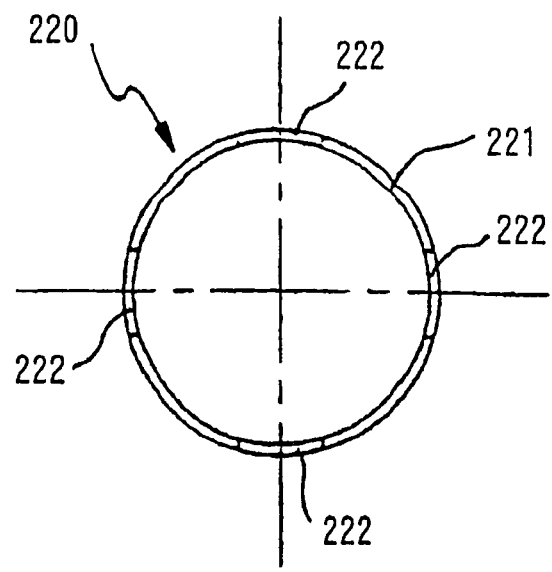
FIGS. 5A and 5B are a plan view and a side view showing details of a gear case constituting a reduction device.
Figure 5B:
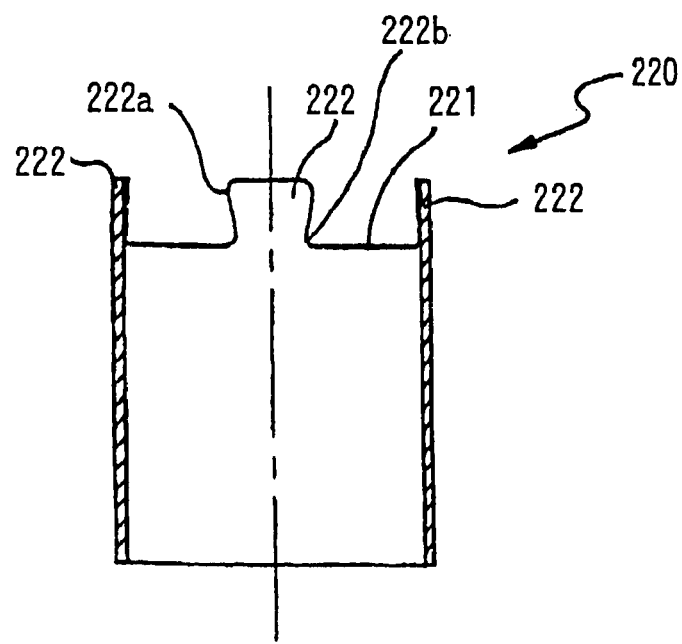

FIGS. 5A and 5B are diagrams showing details of a gear case 220 constituting the reduction mechanism 40. FIG. 5A is a plan view and FIG. 5B is a sectional view. The gear case 220 is a cylindrical member. A lower part of the gear case 220 is fit in an upper part of the valve body 10 (see FIG. 1). Each of four tongues 222 formed to protrude upward from an upper edge 221 of the gear case 220 is formed in a reverse taper shape in which a tip 222a thereof is wide compared with a bottom 222*b* thereof. Under cut sections are formed at both side edges of the tongue 222. The tongue 222 is inserted in the recess 234 (see FIG. 6) of the ring gear 44 shown in FIG. 11 and heated. Then, plastic as a material of the ring gear 44 is fused and the ring gear 44 is surely fixed in the gear case 220.

Figure 6A:
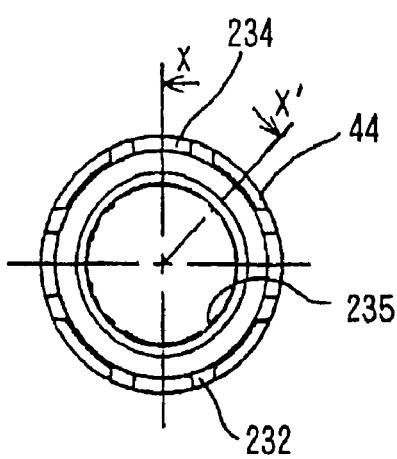
FIGS. 6A, 6B, and 6C are a plan view, a sectional view, and a side view showing details of a fixed gear 120.
Figure 6B:
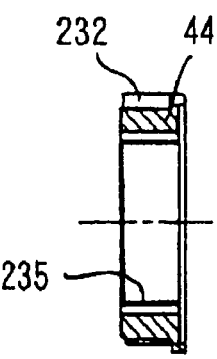
Figure 6C:
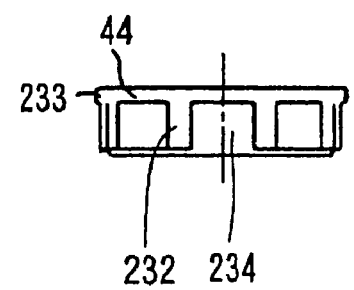

FIGS. 6A to 6C are diagrams showing details of the ring gear 44. FIG. 6A is a plan view, FIG. 6B is a sectional view taken along X-X' in FIG. 6A, and FIG. 6C is a Y direction sectional view of FIG. 6A. The ring gear 44 is, for example, a gear of a ring shape manufactured by molding plastic. A flange 233 is formed in the outer periphery of the ring gear 44 and recesses 234 and projections 232 for fixing the ring gear 44 to an upper part of the gear case 220 are alternately formed in the peripheral direction. A ring gear tooth 235, which is one of components constituting the reduction mechanism 40, is formed on the inner peripheral side of the ring gear 44.

Figure 7A:
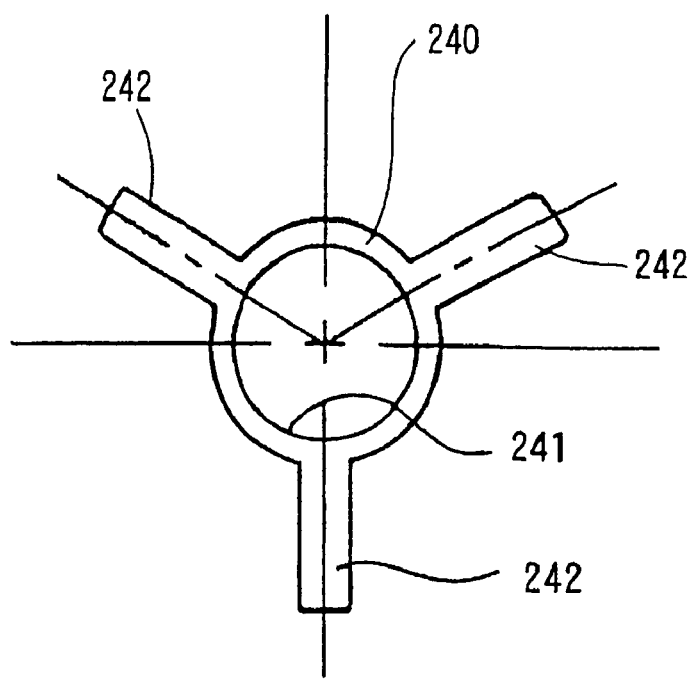
FIGS. 7A and 7B are a plan view and a side view of a disc spring that prevents the lift of the fixed gear.
Figure 7B:
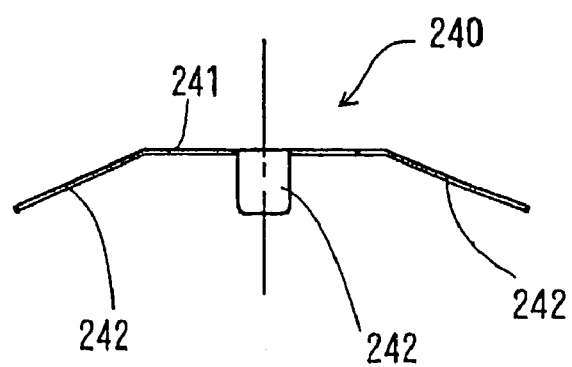

FIGS. 7A and 7B are diagrams showing details of a disc spring 240 that suppresses the lift of the ring gear 44 and the noise due to the vibration during the rotation of the rotor. FIG. 7A is a plan view and FIG. 7B is a side view. As shown in FIG. 1 as well, the ring gear 44 fits in the upper part of the gear case 220 is prevented from lifting by the disc spring 240 disposed between the ring gear 44 and the rotor assembly 8. It is possible to reduce, with the spring property of the disc spring 240, the vibration caused during the rotation of the rotor and suppress the noise due to the vibration. The disc spring 240 is a spring of a ring shape that has a hole 241 through which the boss 205, in which the sun gear 41 of the rotor assembly 8 is provided, pierces. The disc spring 240 has spring sections 242 that extend in three directions from the outer periphery thereof.

Figure 8A:
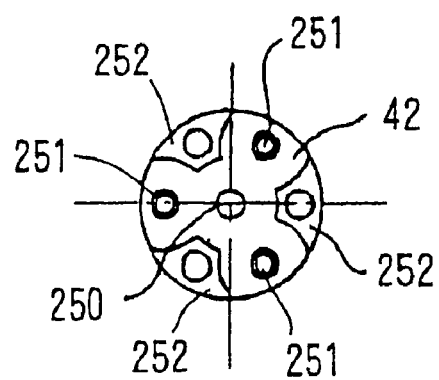
FIGS. 8A to 8D are plan views and sectional views showing details of a carrier and a planetary gear constituting the reduction device.
Figure 8B:
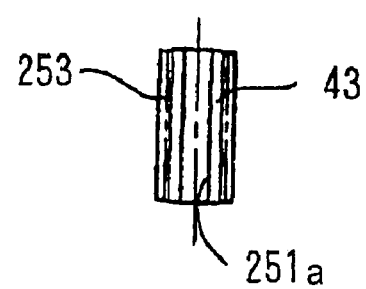
Figure 8C:
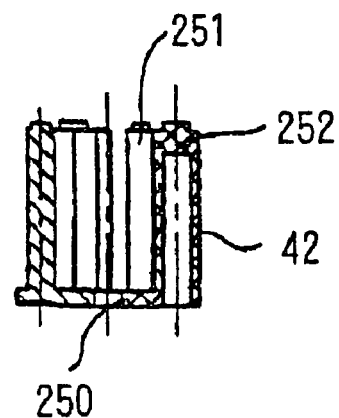
Figure 8D:
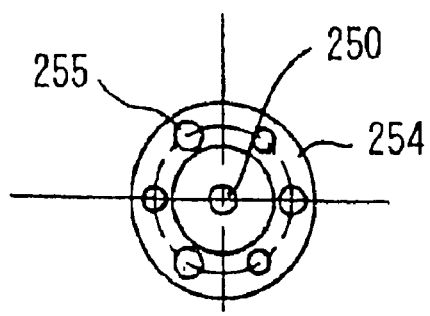

FIGS. 8A to 8D are diagrams showing details of the carrier 42 and the planetary gear 43 constituting the reduction mechanism 40. FIG. 8A is a plan view of the carrier 42, FIG. 8B is a sectional view of the planetary gear 43, FIG. 8C is a sectional view of the carrier 42, and FIG. 8D is a plan view of the carrier 42 covered with a plate 254. The carrier 42 is formed by, for example, molding plastic and includes a disc having, in the center thereof, a hole 250 through which the shaft 201 pierces. In the peripheral edge of an upper surface of the carrier 42, three masts 251 extending upward and three partition walls 252 are alternately provided in the peripheral direction. The planetary gear 43 is formed in a cylindrical shape. The planetary gear 43 has, in the center thereof, a hole 251*a* in which the masts 251 of the carrier 42 are rotatably fit and has a gear section 253 in the outer periphery thereof. The upper surface of the carrier 42, in which the respective masts 251 are fit in the planetary gears 43, is covered with one washer-like plate 254. The masts 251 and projections at the top of the partition wall 252 are pressed into holes 255 of the plate 254 and fixed.

Figure 9A:
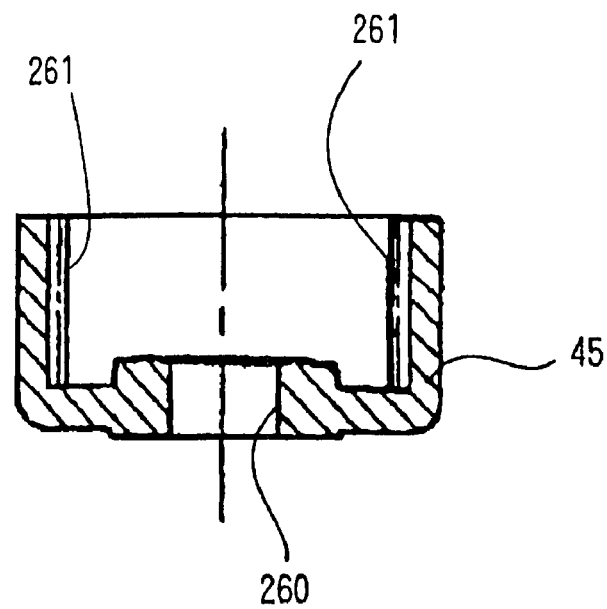
FIGS. 9A and 9B are sectional views showing details of an output gear and an output shaft constituting the reduction device.
Figure 9B:
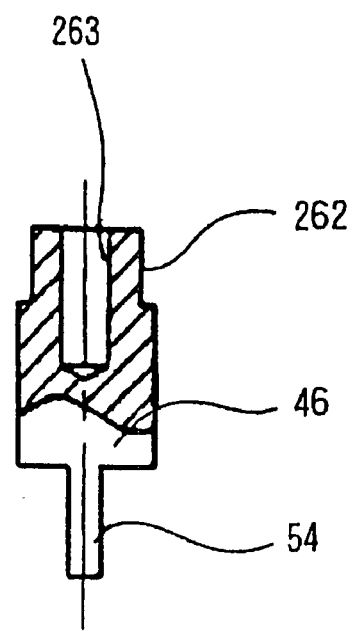

FIGS. 9A and 9B are sectional views showing details of the output internal gear 45 constituting the reduction mechanism 40 and the output shaft 46 integral with the output internal gear 45. The output internal gear 45 has a bottomed cylindrical shape. A hole 260 into which a columnar section 262 of the output shaft 46 is pressed is formed in the center of the bottom wall thereof. An internal gear 261 is formed in the inner periphery of the output internal gear 45. In the output shaft 46, a bottomed hole 263 that receives the shaft 201 is formed. A projection 54 as a flat driver section of a minus driver shape is formed on a side opposite to a side where the hole 263 is formed. As shown in FIG. 1, the projection 54 as the flat driver section is inserted in the slit-like recess 55 of the screw shaft 52 and engaged therein. A projection may be provided on the screw shaft 52 side and a recess in which this projection is engaged may be provided on the output shaft 46 side.

In the reduction mechanism 40, the sun gear 41 of the rotor assembly 8 is an input gear. The planetary gears 43 supported by the carrier 42 simultaneously engage with the sun gear 41, the ring gear 44 as a fixed gear in which internal teeth are formed, and the output internal gear 45 is formed. The entire carrier 42 is supported to be freely rotatable on the output internal gear 45. The ring gear 44 and the output internal gear 45 are in a relation of displacement from each other and have slightly different number of teeth. When the planetary gears 43 rotate and revolve while engaging with the fixed ring gear 44, the output internal gear 45 rotates with respect to the ring gear 44 on the basis of the difference in the number of teeth. Therefore, in the reduction mechanism 40, an input of the sun gear 41 is reduced and outputted to the output internal gear 45. For example, the reduction is performed at a large reduction gear ratio of about 50 to 1. The rotation of the rotor assembly 8 is reduced to, for example, 1/50 and transmitted to the output shaft 46 and to the screw shaft 52. The screw shaft 52 is capable of rotating at a very small number of revolutions. The displacement in the axial direction of the screw shaft 52 corresponding to the rotation can be controlled to very small displacement. The control of a valve opening with high resolution is attained.

Figure 10:
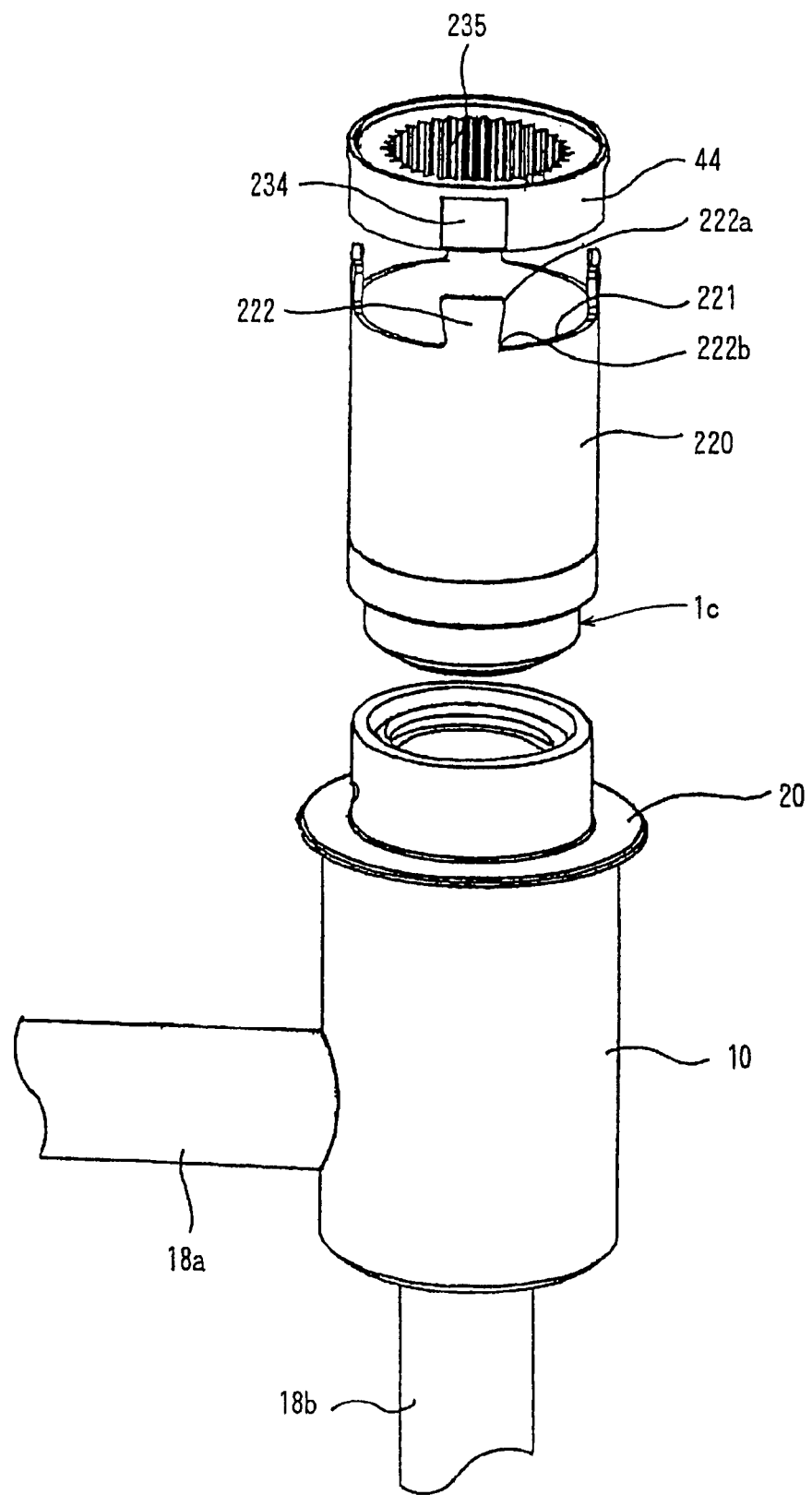
FIG. 10 is a disassembled perspective view of a main part.

FIG. 10 is a disassembled perspective view of a main part of the motor-operated valve 1. The two pipes 18*a* and 18*b* are fluid-tightly attached to the valve main body 10. The receiving member 20 for attaching the can 30 is welded to the outer periphery in the upper part of the valve main body 10. A cylindrical upper part of the valve main body 10 extends upward piercing through the receiving member 20. As shown in FIG. 1, the feed screw mechanism 1*c* including the screw shaft 52 and the cylindrical bearing 50 that engages with the screw shaft is fit in the cylindrical upper part. The lower end of the gear case 220 is fit in the cylindrical upper part of the valve main body 10. In the inside of the gear case 220, the reduction mechanism 40 is arranged above the feed screw mechanism 1*c*. The four tongues 222 and the recess 211 are formed in the upper part of the gear case 220. The tips 222*a* of the tongues 222 are formed in a width dimension larger than that of the bottoms 222*b*. In the fixed ring gear 44, which is a component of the reduction mechanism 40 and made of resin or the like, the ring gear tooth 235 is formed on the inner peripheral surface thereof and the four recesses 234 are formed in the outer periphery thereof. The ring gear 44 is firmly fixed by inserting the recesses 234 into the tongues 222 of the gear case 220, heating the inserted portions, and fusing the fixed gear made of plastic.

As an embodiment of the motor-operated valve according to the present invention, there is a motor-operated valve described below. In this motor-operated valve, it is preferable that a gear module "m" defining a size of teeth of gears used in the reduction mechanism 40 is set to 0.2 to 0.4. When the gear module "m" is set too smaller than this range, it is difficult to manufacture the teeth of the gears because the teeth are too small. To withstand the magnitude of a transmission torque, it is necessary to set a length in the axial direction large and the length of the reduction mechanism 40 increases. Conversely, when the gear module "m" is set larger than the range, it is easy to manufacture the teeth of the gears. However, a gear diameter increases and the diameter of the reduction mechanism 40, i.e., the size of the motor-operated valve also increases. By adopting a so-called strange gear mechanism, in which the numbers of teeth of the ring gear 44 and the output internal gear 45 are slight different, as the structure of the reduction mechanism 40, it is possible to obtain a large gear reduction ratio of 30 to 100 although a gear external shape, for example, a root diameter of the ring gear 44 is extremely small at 15φ or less. As the screw shaft 52 of the feed screw mechanism 1c, a M3 to M7 small triangular screw (or a trapezoidal screw or a square screw) with a screw pitch of 0.5 to 1.5 mm can be adopted.

In the reduction mechanism 40, in the case in which the number of teeth of the output internal gear 45 is larger than the number of teeth of the ring gear 44, when the sun gear 41 rotates clockwise (CW) integrally with the rotor assembly 8 according to the actuation of the motor excitation device 2, the planetary gears 43 meshing with the sun gear 41 and the ring gear 44 revolve around the sun gear 41 while rotating counterclockwise (CCW). As a result, the carrier 42 is reduced and rotates clockwise (CW). The output internal gear 45 meshing with the planetary gears 43 is further reduced and rotates clockwise (CW) on the basis of the difference in the number of teeth between the output internal gear 45 and the ring gear 44. In the reduction mechanism 40, when the numbers of teeth of the sun gear 41, the planetary gears 43, the ring gear 44, and the output internal gear 45 are Z1, Z2, Z3, and Z4, respectively, an output gear ratio, i.e., a reduction gear ratio of the output internal gear 45 is represented by the following equation:

Reduction gear ratio=[Z4*(Z1+Z3)]/[Z1(Z4−Z3)]

where, Z3≠Z4

The denominator and the numerator may be divided by Z1 and Z4 to represent the reduction gear ratio as follows.

Reduction gear ratio=(1+Z3/Z1)/(1−Z3/Z4)

The reduction gear ratio can be set larger when the difference between the number of teeth of the ring gear 44 and the number of teeth of the output internal gear 45 is smaller. Thus, when it is desired to set the reduction gear ratio large and the number of planets is 3, [Z4−Z3]=3. The reduction gear ratio can be set larger when Z3/Z1 is larger. Thus, the number of teeth Z3 of the ring gear 44, the number of teeth Z4 of the output internal gear 45, and the number of teeth Z2 of the planetary gears 43 are determined, respectively, in order to reduce the number of teeth Z1 of the sun gear 41 and obtain a necessary reduction gear ratio.

When Z1=12, Z2=18, Z3=48, and Z4=54, an output gear ratio of the output internal gear 45 is a large reduction gear ratio of 1/45. Since the rotation of the rotor assembly 8 is transmitted to the screw shaft 52 at a large reduction gear ratio, it is possible to control a valve opening finely, i.e., with high resolution.

Figure 11A:
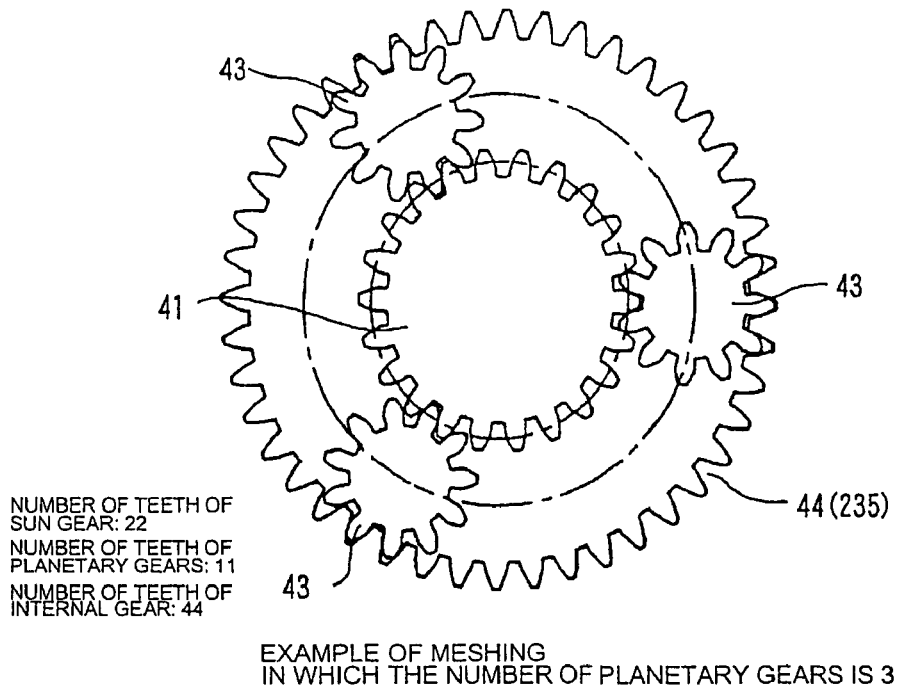
FIGS. 11A and 11B are plan views showing examples of a planetary gear reduction mechanism.
Figure 11B:
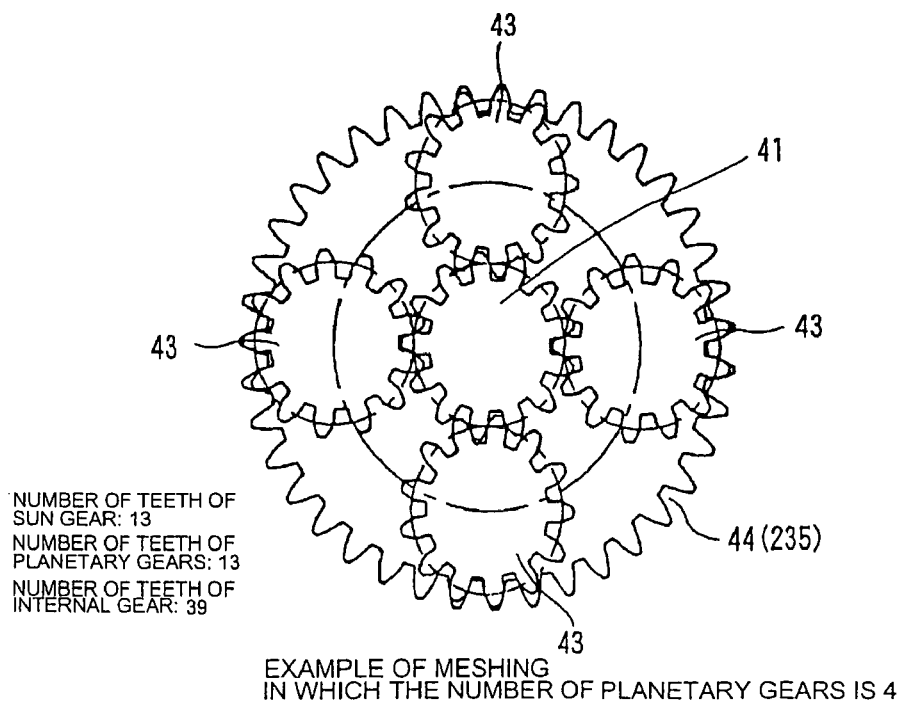

FIGS. 11A and 11B are plan views showing examples of the planetary gear reduction mechanism. FIG. 11A is a diagram of an example in which the number of planetary gears is 3 and FIG. 11B is a diagram of an example in which the number of planetary gears is 4. In the case of FIG. 11A, the number of teeth of the sun gear 44 is 22, the number of teeth of the planetary gears 43 is 11, and the number of internal teeth of the ring gear 44 is 44. In the case of FIG. 11B, the number of teeth of the sun gear 41 is 13, the number of teeth of the planetary gears 43 is 13, and the number of internal gears of the ring gear 44 is 39.

The feed screw mechanism 1c converts the rotation of the rotor assembly 8, which is transmitted to the output shaft 46 via the planetary gear reduction mechanism 40, into a linear action for bringing the valve body 60 into contact with and away from the valve seat 62. The feed screw mechanism 1c has the cylindrical bearing 50 and the screw shaft 52. The cylindrical bearing 50 is supported by the valve main body 10 and rotatably supports the output shaft 46 on the upper side thereof. In the cylindrical bearing 50, the female screw section 51 is formed in the inner periphery on the lower side thereof. In the screw shaft 52, the male screw section 53 that is screwed in the female screw section 51 is formed. The cylindrical bearing 50 is fixed and supported to be fit in an upper part of a valve hole 63 formed in the valve main body 10. In other words, the cylindrical bearing 50 is a fixed screw section and the screw shaft 52 is a moving screw section. The projection 54 formed at the lower end of the output shaft 46 engages with the recess 55 formed at the upper end of the screw shaft 51 and transmits the rotation of the output shaft 46 to the screw shaft 51. The upper end of the output shaft 46 is coupled and fixed to the rotation shaft of the rotor assembly 8.

The displacement in the axial direction of the screw shaft 52 is transmitted to the valve body 60 via the ball 65 and the ball bearing member 66. A force from the feed screw mechanism 1c for pushing down the valve body 60 in a valve closing direction is transmitted via the ball 65 and the ball bearing member 66. In order to remove backlash between the female screw section 51 and the male screw section 53 when the feed screw mechanism 1c moves the screw shaft 52 in a valve opening direction, a coil spring 70 that urges the valve body 60 in the valve opening direction is provided in the valve main body 10.

In order to support the coil spring 70, a bottomed cylindrical spring bearing 73 (a spring covering member) made of metal is disposed in the valve chamber 12. The spring bearing 73 has a cylindrical peripheral wall 74 that covers the outer peripheral surface of the valve body 60 except the lower end thereof, an outward flange section 75 formed at the upper end of the peripheral wall 74 to be bent to the outer side, and an inward flange section 76 formed at the lower end of the peripheral wall 74 to be bent to the inner side. In the inward flange section 76, a hole 77 through which the valve body 60 can pierce is formed. An upper end 71 of the coil spring 70 is in contact with a large diameter section 67 of the valve body 60 and a lower end 72 thereof is in contact with the inward flange section 76 of the spring bearing 73, whereby the coil spring 70 is supported in a compressed state. The outward flange section 75 of the peripheral wall 74 is nipped and fixed between the stepped section 64 formed at the lower end of the valve hole 63 of the valve main body 10 and the lower end of the cylindrical bearing 50 inserted in the valve hole 63.

The valve body 60 is always urged in the valve opening direction (the direction of the feed screw mechanism 1c) by a spring force of the coil spring 70 held in the compressed state in the spring bearing 73. When the valve body 60 is pushed down in the valve closing direction by a force from the feed screw mechanism 1c, the valve body 60 is lowered against the spring force of the coil sprig 70 and the tip of the valve body 60 is seated on the valve seat 62 to close the orifice 14. A position of the valve body 60 with respect to the valve seat 62 can be positioned by the gear reduction unit 1b with high resolution. Thus, a channel area between the valve body 60 and the orifice 14 can be highly accurately controlled and a flow rate of a coolant passing through the channel can be highly accurately adjusted. When the feed screw mechanism 1c is actuated in the valve opening direction, the valve body 60 is moved to follow the rise of the screw shaft 52 by the spring force of the coil spring 70. Conventionally, bellows are attached to the outer side of the valve body 60 to prevent the coolant led into the valve chamber 12 from entering the can 30. An upward urging force is given to the valve body 60 by a fluid pressure acting on the bellows and an elastic force of the bellows themselves. According to this embodiment, the bellows manufactured from an expensive material is not used. The coolant can be prevented from entering the can 30 with the seal 56 between the cylindrical bearing 50 and the valve body 10. If the components in the can 30 are made of a material not swelled by the coolant or foreign matters are prevented from entering the can 30 by a filter or the like, the coolant may enter the can 30.

Figure 15:
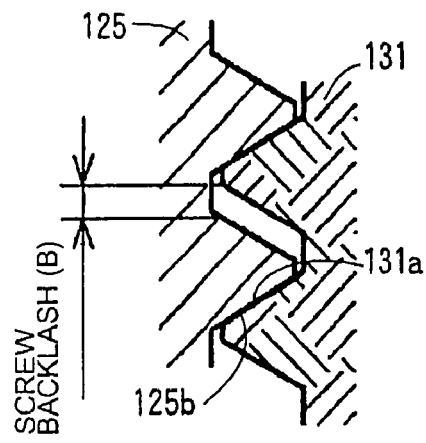
FIGS. 15A and 15B are explanatory diagrams of backlash of a feed screw mechanism and problems due to the backlash.
Figure 15:
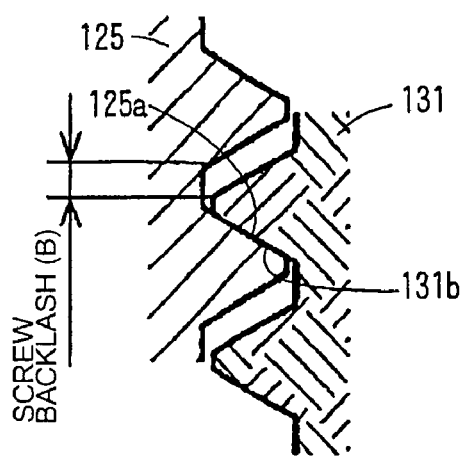
Figure 16:
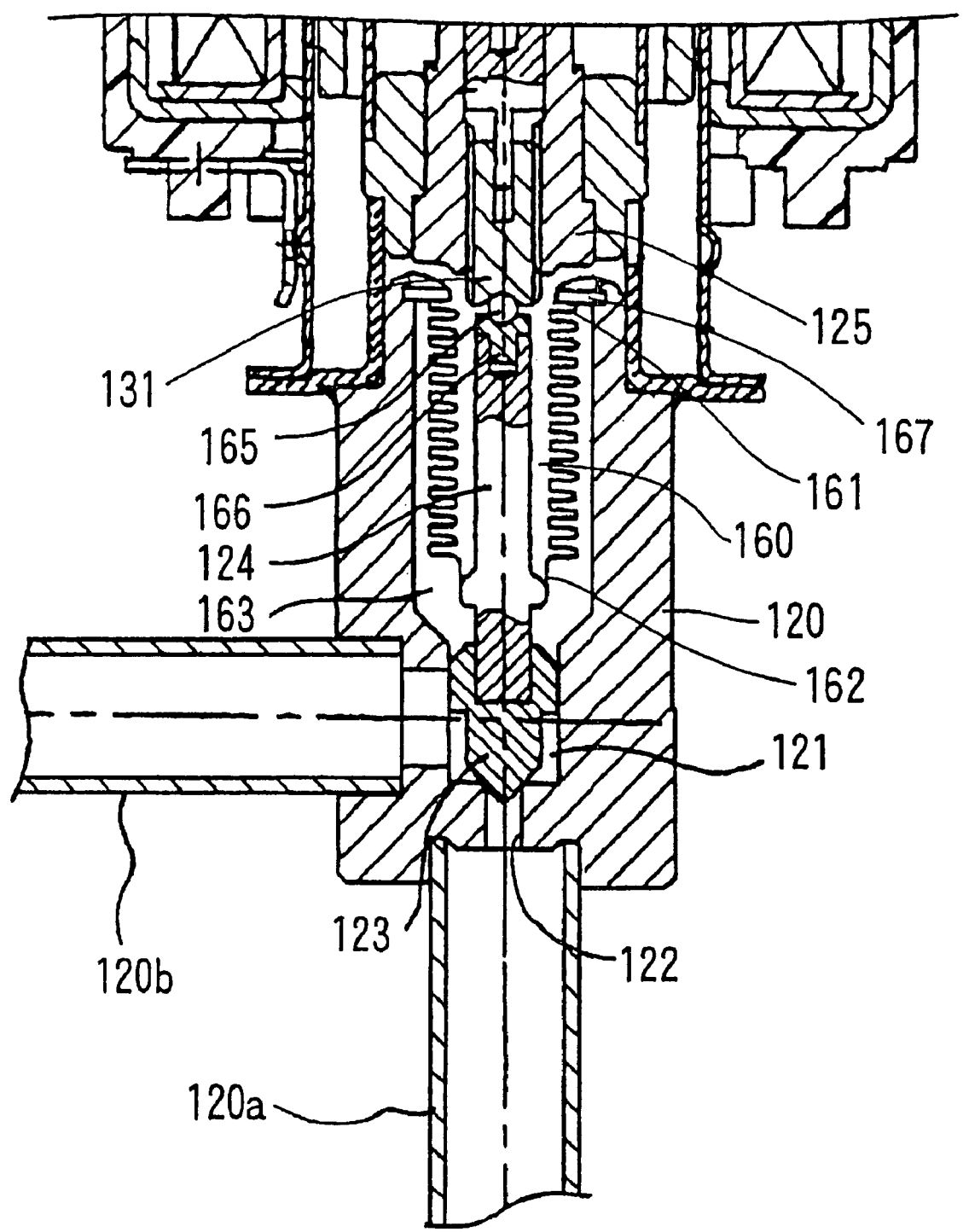
FIG. 16 is a sectional view showing an example of a conventional motor-operated valve including bellows.

As described above, the coil spring 70 urges the feed screw mechanism 1c in the valve opening direction with the spring force thereof. Thus, the backlash present between the female screw section 51 of the cylindrical bearing 50 and the male screw section 53 of the screw shaft 52 is absorbed by providing the screw shaft 52 upward with respect to the cylindrical bearing 50. Therefore, an arrangement relation between the female screw unit 51 and the male screw unit 53 is as shown in FIG. 15A and a state in which screw backlash B is absorbed is maintained. In closing the valve, when the valve body 60 comes into contact with the valve seat 62, a reaction is immediately transmitted from the male screw section 53 to the female screw section 51 without undergoing an invalid process of absorbing the screw backlash B. In opening the valve, when the valve body 60 moves away from the valve seat 62, the male screw unit 53 moves to follow the female screw unit 51 while keeping a form shown in FIG. 15A. In this embodiment, since the coil spring 70 is provided in the valve chamber 12, it is possible to set a dimension in the vertical direction of the motor-operated valve smaller than that of the motor-operated valve in which the coil spring 12 is provided above the valve chamber 12.

In this embodiment, the spring bearing 73 that covers the coil spring 70 is arranged in the valve chamber 12. The bottom of the spring bearing 73 is apart from the bottom surface of the valve chamber 12 and a space of a U shape in section is formed around and below the spring bearing 73. Therefore, the valve chamber 12 is formed larger than that in the past and a sufficient quantity of the coolant stored therein is secured. It has been found through experiences that, as the valve chamber 12 is larger, a change in a state in the valve chamber 12 involved in the flow of the coolant into and out of the valve chamber 12 is smaller during the operation of a cooling cycle and passing sound of the coolant is reduced. In the structure of the valve main body 10 according to this embodiment, such reduction of passing sound can also be realized. Moreover, since the outer side of the coil spring 70 is covered with the spring bearing 73, the coil spring 70 is protected from the flow of the coolant and the coil spring 70 and the flow of the coolant do not directly interfere with each other. Therefore, deformation and breakage of the coil spring 70 due to the flow of the coolant and adhesion of dust and the like, which may be included in the coolant, to the coil spring 70 can be prevented. Furthermore, the structure including only the coil spring 70 and the spring bearing 73 is inexpensive compared with the bellows.

Figure 2:
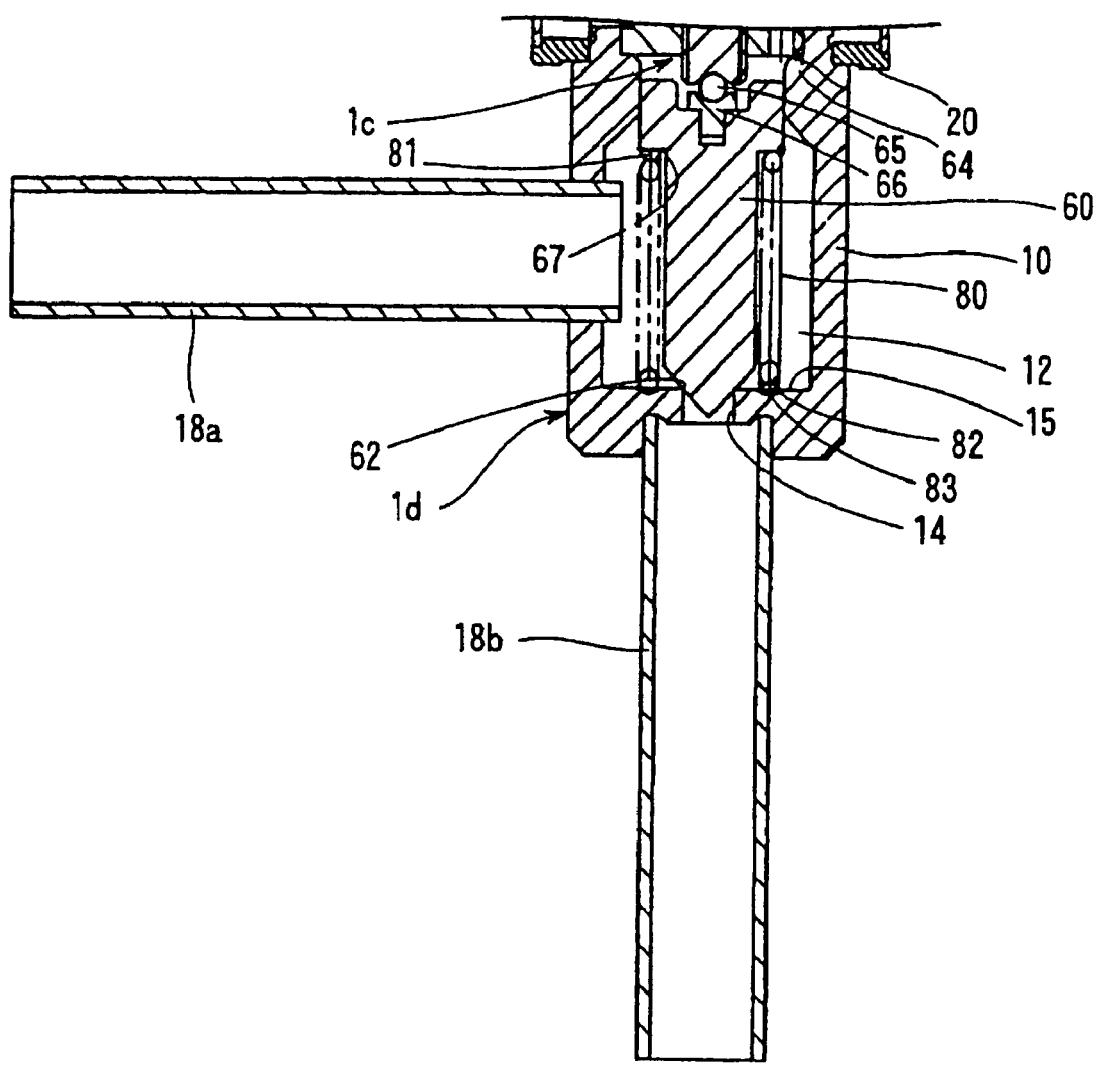
FIG. 2 is a main part sectional view showing a motor-operated valve according to another embodiment of the present invention.

FIG. 2 is a partial sectional view showing another embodiment of the present invention. In the embodiment shown in FIG. 2, only the valve main body 10 is shown in section. Since the driving unit 1a, the gear reduction unit 1b, and the feed screw mechanism 1c are equivalent to those of the embodiment shown in FIG. 1, illustration and explanation of these components are omitted. In the embodiment shown in FIG. 2, the spring bearing 73 shown in FIG. 1 is omitted. An upper end 81 of a coil spring 80 is in contact with the large diameter section 67 of the valve shaft 60 and a lower end 82 thereof is directly in contact with and supported by the bottom surface 15 of the valve chamber 12. In this case, protection of the coil spring 80 from the coolant cannot be expected. However, it is possible to further reduce the number of components and the assembly man-hours to reduce manufacturing cost. It is possible to stabilize positions of the lower end 82 of the coil spring 80 by forming a concave groove 83 that receives the lower end 82 of the coil spring 80 in the bottom surface 15.

The valve main body and the spring bearing with which both the ends of the coil spring 70 in the embodiment shown in FIG. 1 and the coil spring 80 in the embodiment shown in FIG. 2 are in contact or a contact surface of the valve body is usually formed as a flat surface. Since end faces of the coil springs 70 and 80 tilt with respect to the center axes thereof, it is usually difficult to obtain an ideal state in which the coil spring 70 and 80 are in contact with the valve body 60 without a gap. The coil springs 70 and 80 may tilt with respect to the valve body 60 during assembly or during operation of the coil springs 70 and 80. In this state, the coil springs 70 and 80 apply not only a force in the center axis (valve opening and closing) direction but also a force in a direction crossing the center axis to the valve body 60. The forces in such directions cause a pinch force to act on the valve body 61 and the valve seat 62. As a result, the operation of valve opening and closing is not smoothly performed and durability falls because of abrasion and the like.

Figure 12:
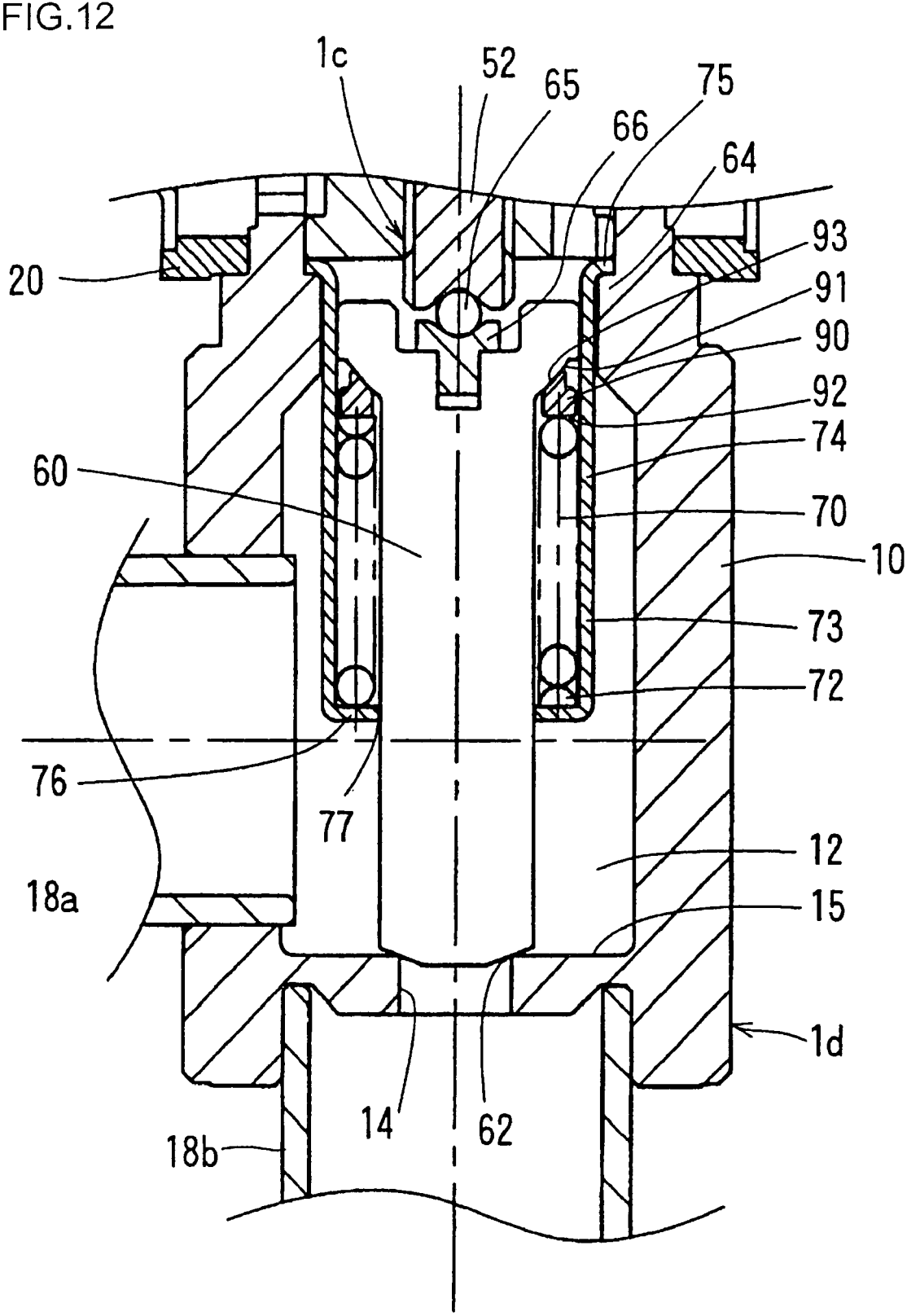
FIG. 12 is a sectional view of a main part of a motor-operated valve according to still another embodiment of the present invention.

FIG. 12 is a sectional view of a main part of a motor-operated valve according to an embodiment that solves the problem. The upper end 71 of the coil spring 70 is in contact with a contact surface 91 of the valve body 60 via a spring bearing ring 90 arranged coaxially with the valve body 60. The contact surface 91 is formed in a convex spherical shape. In the spring bearing ring 90, a contact surface 92 between the coil spring 70 and the upper end 71 is formed as a flat surface of an annular shape. A contact surface 93 with the valve body 60 is formed in a concave spherical shape that is in slide contact with the convex spherical surface without a gap. As a result, during assembly, even if the coil spring 70 is about to tilt, the tilt of the coil spring 70 is absorbed by an alignment action realized by sliding of curved surfaces of the spring bearing ring 90 and the valve body 60 without forming a gap. Since the tilt of the coil spring 70 is absorbed, the force in the direction crossing the center axis applied from the coil spring 70 to the valve body 60 decreases. Consequently, it is possible to realize stabilization of the valve opening and closing operation and improvement of durability.

The contact surfaces 91 and 93 can be formed in a conical surface instead of the spherical surface. In the case of the conical surface, it is difficult to shift relative positions of the surfaces while completely eliminating a gap. However, aligning curved surfaces can perform an aligning action equivalent to that in the case of the spherical surface.

Figure 13:
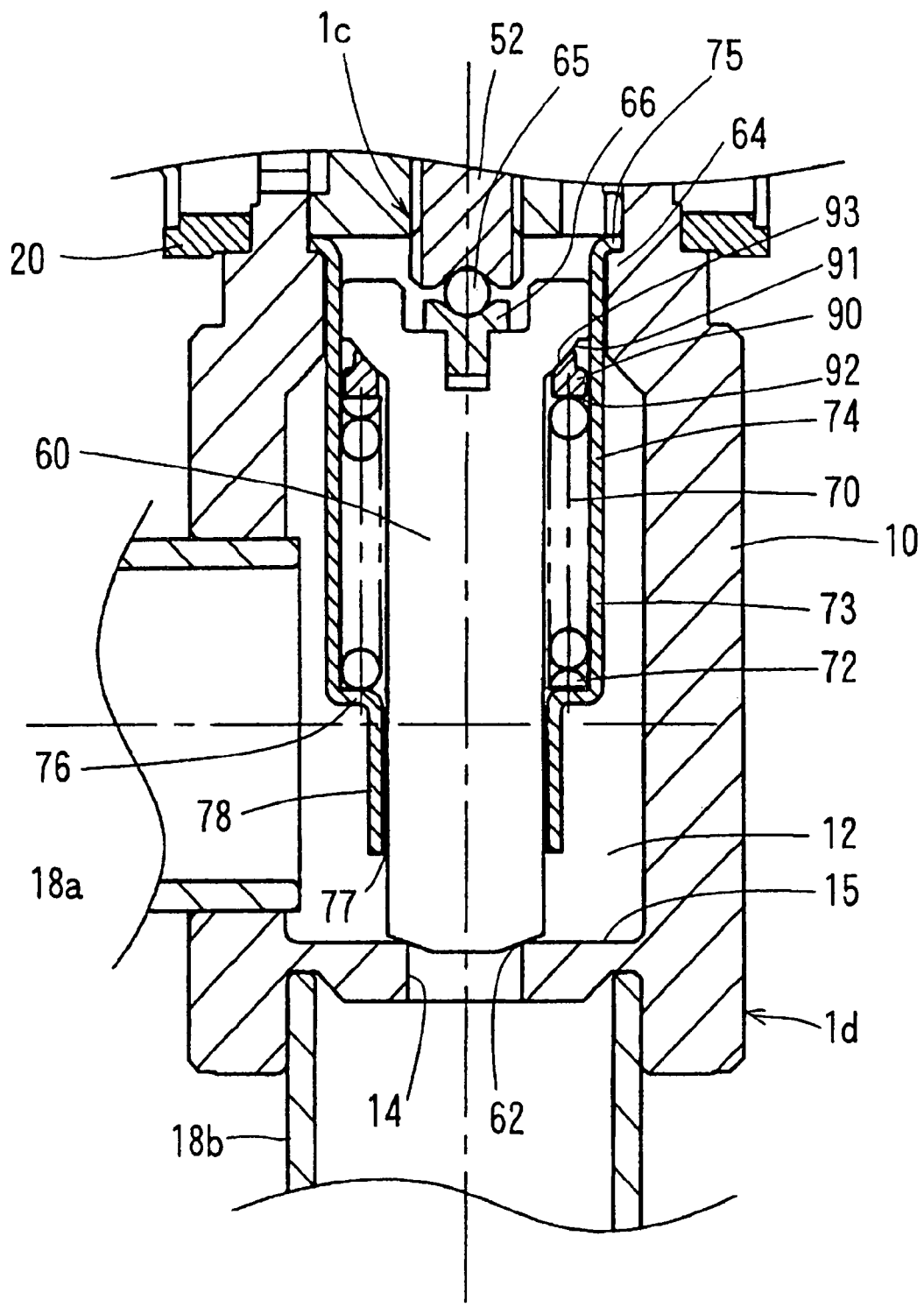
FIG. 13 is a sectional view of a main part of a motor-operated valve according to still another embodiment of the present invention.
Figure 14:
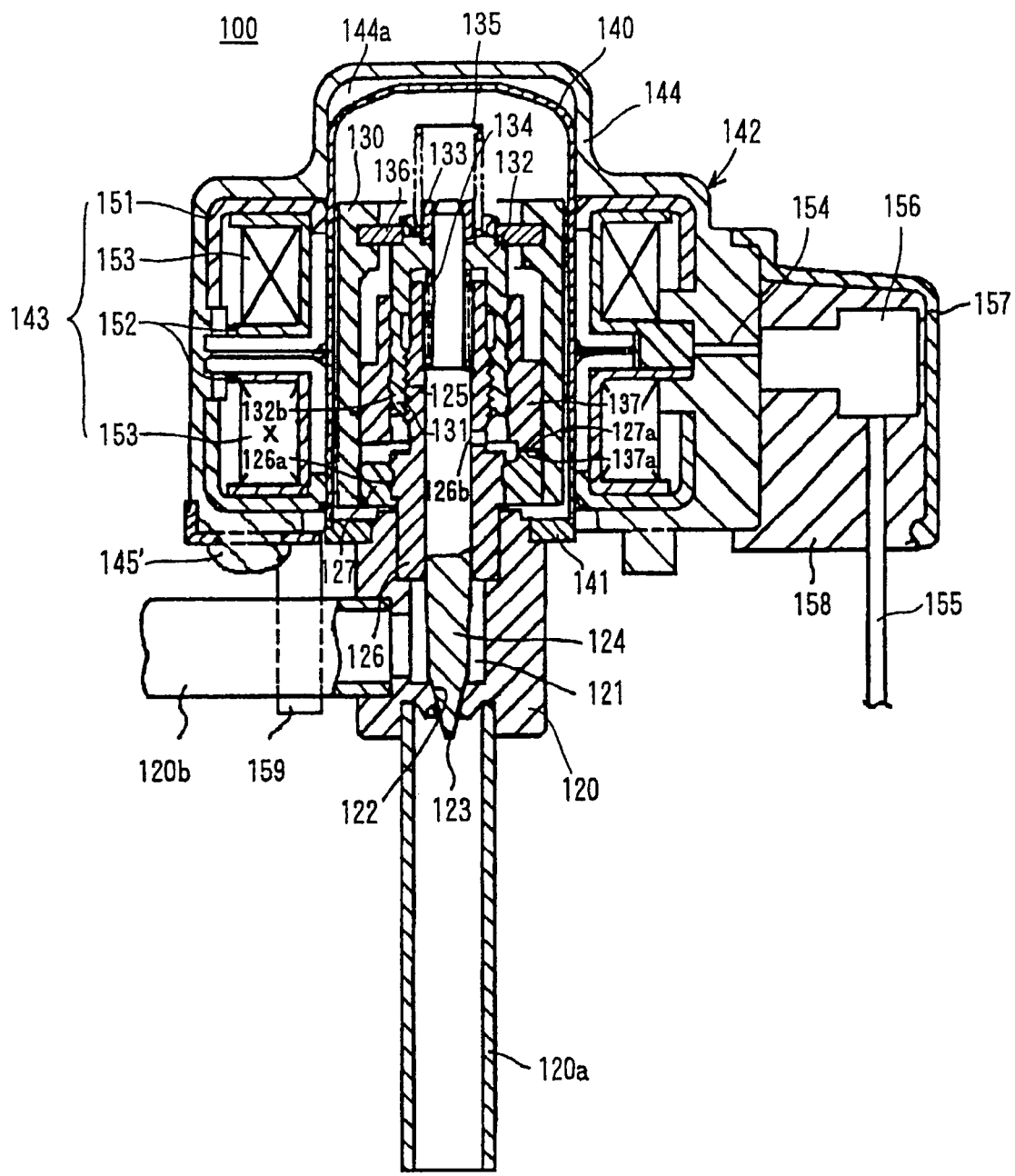
FIG. 14 is a sectional view showing an example of a conventional motor-operated valve.

Still another embodiment of the present invention is shown in FIG. 13. Components and sections equivalent to those in the embodiment shown in FIG. 12 are denoted by the same reference numerals and signs and redundant explanations of the components and the sections are omitted. In the embodiment shown in FIG. 13, the spring bearing 73 includes a guide cylinder section 78 that extends from the inward flange section 76 along the valve body 60. Since a guide length of the valve body 60 is extended by the guide cylinder section 78, linearity of movement in the vertical direction of the valve body 60 is improved and foreign matters, which can be included in the coolant, are prevented from entering the feed screw mechanism 1c side.

The embodiments of the present invention have been explained by citing the specific examples. However, the present invention is not limited to the embodiments. Various modifications can be applied to the embodiments without departing from the spirit of the present invention.

What is claimed is:

1. A motor-operated valve comprising:

a valve main body that has a valve chamber and a valve seat formed in the valve chamber;

a valve body that comes into contact with and moves away from the valve seat to adjust a passing flow rate of a fluid;

a driving unit that has a rotor and a stator that drives to rotate the rotor;

a feed screw mechanism that converts the rotation of the rotor into actions of the valve body coming into contact with and moving away from the valve seat;

a spring that urges the valve body in a direction away from the valve seat to remove backlash intrinsic in the feed screw mechanism, and a means for absorbing a tilt of a coil spring by an alignment action realized by sliding of curved surfaces of a spring bearing ring and the valve body without forming a gap, wherein the spring is arranged in the valve chamber.

2. The motor-operated valve according to claim 1, wherein a spring cover member that covers the spring is provided.

3. The motor-operated valve according to claim 1, wherein a spring cover member that covers the spring is provided, and the spring cover member also functions as a spring bearing that receives an end of the valve seat side of the spring.

4. The motor-operated valve according to claim 1, wherein, in order to reduce rotation of the rotor and transmit the rotation to the feed screw mechanism, a gear reduction unit including one of a gear train mechanism and a planetary gear mechanism, that transmissively couples the rotor and the feed screw mechanism is provided.

5. The motor-operated valve according to claim 1, wherein, the means for absorbing the tilt of the spring by the alignment action is equipped in the spring bearing ring, an end of the coil spring is in contact with the valve body via the spring bearing ring arranged coaxially with the valve body, and the spring bearing ring is slidably combined with the valve body such that the spring bearing ring can take a state in which a center axis thereof tilts with respect to a center axis of the valve body.

6. The motor-operated valve according to claim 1, wherein, the means for absorbing the tilt of the spring by the alignment action is equipped in the spring bearing ring, an end of the coil spring is in contact with the valve body via a spring bearing ring arranged coaxially with the valve body, and the spring bearing ring is slidably combined with the valve body such that the spring bearing ring can take a state in which a center axis thereof tilts with respect to a center axis of the valve body, slide contact surfaces of the spring bearing ring and the valve body are formed in a spherical shape.

* * * * *